(12) United States Patent
Newcomb

(10) Patent No.: US 9,378,324 B2
(45) Date of Patent: Jun. 28, 2016

(54) SYSTEM AND METHOD OF DETECTING DESIGN RULE NONCOMPLIANT SUBGRAPHS IN CIRCUIT NETLISTS

(71) Applicant: Jesse Conrad Newcomb, Daly City, CA (US)

(72) Inventor: Jesse Conrad Newcomb, Daly City, CA (US)

( * ) Notice: Subject to any disclaimer, the term of this patent is extended or adjusted under 35 U.S.C. 154(b) by 824 days.

(21) Appl. No.: 13/737,764

(22) Filed: Jan. 9, 2013

(65) Prior Publication Data

US 2013/0125072 A1    May 16, 2013

Related U.S. Application Data

(63) Continuation-in-part of application No. 12/870,753, filed on Aug. 27, 2010, now abandoned.

(60) Provisional application No. 61/303,507, filed on Feb. 11, 2010, provisional application No. 61/731,443, filed on Nov. 29, 2012.

(51) Int. Cl.
*G06F 17/50* (2006.01)

(52) U.S. Cl.
CPC .......... *G06F 17/5081* (2013.01); *G06F 17/504* (2013.01); *G06F 17/5045* (2013.01); *G06F 2217/74* (2013.01)

(58) Field of Classification Search
USPC .......................................... 702/127
See application file for complete search history.

(56) References Cited

U.S. PATENT DOCUMENTS

| | | | | |
|---|---|---|---|---|
| 6,083,269 | A * | 7/2000 | Graef | G06F 17/505 703/14 |
| 6,526,546 | B1 | 2/2003 | Rolland et al. | |
| 8,000,951 | B2 | 8/2011 | Arayama | |
| 2010/0185994 | A1 | 7/2010 | Pikus et al. | |
| 2010/0248481 | A1* | 9/2010 | Schultz | G06F 17/5068 438/694 |

\* cited by examiner

*Primary Examiner* — Tung S Lau
(74) *Attorney, Agent, or Firm* — Stephen E. Zweig

(57) ABSTRACT

An automated system and method of performing electronic design rule checking on the netlist of an integrated circuit composed of a plurality of subgraphs. The electronic design rule is embodied as a two part template with a target subgraph specification and a design rule compliance check specification. The target subgraph specification often is at least partially defined by an interactive visual programming section that allows the user to construct a graphic specification of the target netlist. The method first searches the netlist for target subgraphs that match the target subgraph specification, and the user can verify proper target selection. The method then performs rule checks on these search targets, and non compliant subnets identified. Flexibility is enhanced by use of search wildcards, attribute ranges, and various short user scripts which may contain various Boolean logical operations.

4 Claims, 10 Drawing Sheets

SYSTEM AND METHOD OF DETECTING DESIGN RULE NONCOMPLIANT SUBGRAPHS IN CIRCUIT NETLISTS

CROSS REFERENCE TO RELATED APPLICATIONS

This application claims the priority benefit of U.S. provisional patent application 61/731,443, "Progressive search target and rule method of detecting noncompliant subgraphs in circuit netlists", inventor Jesse Conrad Newcomb, filed Nov. 29, 2012; this application is also a continuation in part of application Ser. No. 12/870,753, "Subgraph Searching", inventor Jesse Newcomb, filed Aug. 27, 2010; application Ser. No. 12,870,753 in turn claimed the priority benefit of U.S. provisional application 61/303,507, "Circuit Analysis", inventor Jesse Conrad Newcomb, filed Feb. 11, 2010; the contents of all of these applications are incorporated herein by reference.

BACKGROUND OF THE INVENTION

1. Field of the Invention

This invention is in the field of automated methods for analyzing the design of electrical circuits, such as integrated circuits, for compliance or noncompliance with various electronic circuit design rules.

2. Description of the Related Art

Although many of the areas related to the design of integrated circuits are well established and standardized, some areas are less well established, and less standardized. This is particularly true for situations where chip designers try to cope with various scenarios that are difficult to model by various standard electronic circuit simulation tools such as SPICE and other methods.

For example, consider the problems of designing an integrated circuit chip that has adequate protection against various Electrostatic Discharge (ESD) events. This is a problem that is difficult to model mathematically. This is because typical circuit devices, such as transistors, are typically driven at a few volts, and standard circuit modeling software is designed for this sort of voltage range. By contrast, ESD events can subject the same transistors to shocks of 10,000 volts or more, thus falling far beyond the ability of standard circuit modeling software to give accurate predictions.

As another example, consider the problem of designing a circuit that always has adequate digital driver strength as a function of signal loading. This problem is also difficult to model with standard software. The problem itself can occur when a driver originating in a first circuit power domain is not appropriately linked (e.g. there may or may not be a correct intermediate device such as a resistor) to a receiver circuit device that is located a second and different circuit power domain. Although a circuit design simulator may formally predict that a certain driver configuration is adequate in theory, due to the inability of the software to adequately simulate this part of the circuit, it may not be. Thus design engineers often find it to be prudent to increase driver strength by an empirical and often situation specific safety margin. Experienced circuit designers realize that such steps are needed to produce integrated circuit chips that adequately cope with real world events.

Other difficult to mathematically model problems include the problem of top-heavy drivers, combinations of input/output (IO) pairs that may be overly sensitive to electrical voltage problems, and the like. Here as well, design engineers often cope with these issues by coming up with various and often somewhat empirical circuit design rules.

These circuit design rules often are based on rules of thumb and a particular engineer's or organization's past experience with problems of that sort. Thus each circuit design group may have their own proprietary set of design best practices with regards to how a given integrated circuit should be designed and laid out. Some of these design best practices or electronic design rules include: keeping the physical separation between certain devices be kept at a certain minimum micron distance, adding ground spacers to help guard against possible failure modes, and adding various additional ESD clamp devices be added to certain Input/Output (IO) pads.

In practice, each design group may have one or more electronic design rule gurus, and each guru in turn may have their own set of electronic design rules. Thus integrated circuit chips designed by group "A" in response to input from design guru 1 may have to conform to a different set of electronic design rules (i.e. electronic rule checking or ERC) than the chips designed by group "B" in response to input from design guru 2.

Although some individual electronic design rules may be comparatively simple (e.g. if this situation exists, put in 1 ESD clamp for every "N" IO pads), modern integrated circuits are extremely complex. Thus the process of automatically checking a complex integrated circuit design netlist for compliance to such rules is not simple at all. Here because these design rules are be so variable (being very design guru, organization, and or situation dependent), prior art standardized electronic circuit design and validation software methods, which generally requires standardized rules to operate, often is inadequate for such situations.

Although prior art methods of automatically identifying specific topological patterns in integrated circuit design, such as Pikus et. al. (US publication 2010/0185994 assigned to Mentor Graphics Corporation) have been proposed, such prior art methods were rather narrowly oriented towards identifying particular physical topological structures in a circuit. Such methods are often unsuited for checking many types of electronic design rules.

Other prior art in the field includes Arayama (U.S. Pat. No. 8,000,951, assigned to Fujitsu Limited). Arayama's methods provide templates for finding specific circuit subsets (or subgraphs) such as inverters, flip-flops, or feedback loops, but otherwise are also unsuited for checking many types of electronic design rules.

In principle, because the chip design itself is present in computer readable form (e.g. a computer readable netlist), and because the various local electronic design rules can be expressed logically (e.g. by a large table of contingencies and rules, or procedural decision making), the problem of electronic rule checking is a software problem. In practice however, using brute force software methods to implement such variable and guru dependent rules is very problematic, because the burden of writing large amounts of customized code for each design rule situation and each guru is just too great to be manageable. Certainly any given chip designer (electronic circuit engineer), who needs to know if a particular integrated circuit design is complying with their local set of electronic design rules will generally lack both the skills and time needed to write the large amounts of customized code that prior art methods would require to be used for these situations.

Thus at present, the field is in an unsatisfactory state, because the process of troubleshooting a particular circuit design, at least according to non-standardized electronic design rules, usually requires more skills and time than design engineers, using prior art circuit design and debugging software, can provide.

BRIEF SUMMARY OF THE INVENTION

The invention is based, in part, on the insight that what is needed is a new way to implement various local or non-standardized electronic design rules that is easy to use by average integrated circuit design engineers, and that minimizes the amount of custom programming that is required to do so.

The invention is also based, in part, on the insight that what is needed is a computer implemented software system and method that simplifies the electronic design rule checking process to the point where an average circuit design engineer can perform such checks both simply and easily. That is, what is needed is a system that, for example, allows the circuit design engineer to easily designate the targets (e.g. circuit subset or subgraph) of any particular design rule. This system should also allow the design engineer to easily enter in the circuit design rule itself, and then direct the system software to automatically search an integrated circuit netlist for relevant design rule targets. The system should then allow the engineer to verify that the correct targets have been selected, apply the electronic design rule, and then show the engineer which of the selected targets do or do not comply with that particular design rule.

The invention is also based, in part, on the insight that in general, an electronic design rule can be described in terms of a design rule template with two basic parts. A first part of the design rule template specifies what portions (e.g. what subgraphs) of the larger circuit are going to be the target or object of that design rule. A second part of the design rule template specifies what design rules should then be applied to that target.

Thus an automated process of applying various design rules to a larger circuit, such as an integrated circuit, can be viewed as obtaining a computer readable form of the larger circuit netlist, producing the design rule template in computer readable form, and using the first part of the design rule template to perform a computer search of the netlist for targets or objects of that particular design rule template.

Once these targets (or target subgraphs) have been found by the search, and preferably the suitability of the targets then verified by the user, the automated process will then apply the rules found in the second part of the design rule template to those previously selected targets.

The invention is also based, in part, on the insight that because circuit design engineers generally best interact circuits and parts of circuits in a visual or graphical format—i.e. as one or more images showing a set of electrical devices (transistors, diodes, etc.) and their various electrical connections, ideally the invention would allow the engineers to input target selection rules in this format, and optionally also verify graphically (e.g. visually) that a particular target or set of targets is appropriate to the rule at hand.

At the same time, because similar types of circuits and subcircuits can vary at least somewhat in their exact device type and layout, the invention should preferably allow the design engineer a fair amount of flexibility in the target selection step (and optionally the rule checking step as well) so that all of the targets that should be checked against a rule are actually checked against the rule (i.e. verify that nothing has been missed). It is also important to have the user check that the rule targets are appropriately set so that design rule itself is not inappropriately applied to portions of the circuit where the rule is not needed or is inappropriate.

Thus in at least some embodiments of the invention, various computer implemented systems and methods of implementing subgraph searching (e.g. looking for smaller portions of a larger integrated circuit that may not be fully compliant with various electronic design rules) are discussed. In a preferred embodiment, the invention will allow the user to enter in target selection rules in the form of a graphical pattern (i.e. a pattern that the user can look at visually, and verify by sight that the target subnet looks correct). This graphical pattern may comprise a collection of one or more electronic devices that are usually the target of a particular electronic design rule. The invention's methods then use this graphical pattern to search for matches within the circuit. The invention will then often report these initial matches. Various searches, including ESD clamp searches, signal diode searches, current reference searches, current mirror searches, voltage reference searches, power switch searches, digital stage searches, handcrafted digital stage searches, bandgap searches, amplifier searches, and other types of searches may be performed using these methods. The invention will then further apply a relevant electronic design rule to these initial matches, and usually at least report cases where certain target subgraphs to not comply with the design rule or rules.

Thus to summarize, in some embodiments, the invention may be an automated system and method of performing electronic design rule checking on the netlist of an integrated circuit composed of a plurality of subgraphs. The electronic design rule may be embodied as a two part template with a target subgraph specification and a design rule compliance check specification. The target subgraph specification often is at least partially defined by an interactive visual programming section that allows the user to construct a graphic specification of the target netlist. The method first searches the netlist for target subgraphs that match the target subgraph specification, and the user can verify proper target selection. The method then performs rule checks on these search targets, and non compliant subnets identified. Flexibility is enhanced by use of search wildcards, attribute ranges, and various short user scripts which may contain various Boolean logical operations.

DETAILED DESCRIPTION OF THE INVENTION

Figure 1:
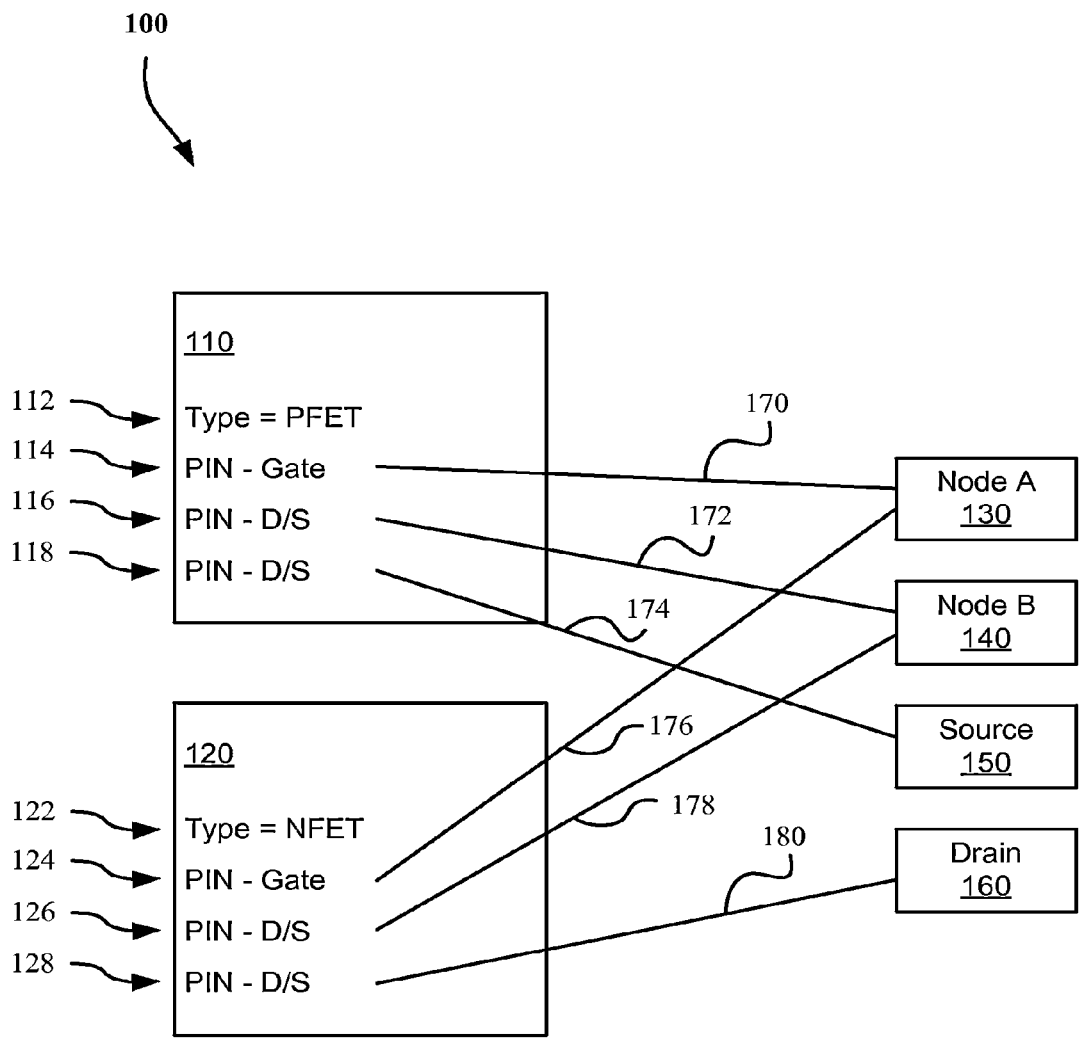
FIG. 1 shows, at a more abstract level, how a design engineer can graphically designate a set of target sub-circuits or subgraphs (e.g. subgraph of the larger integrated circuit design) that the system will search the larger integrated circuit netlist for, and then use for subsequent electronic design rule checking purposes.

In some embodiments, the invention may be a computer software implemented method or system for checking electronic circuit netlists for compliance to at least one design rule. This method will generally operate on a computer readable netlist of an integrated circuit design. This netlist will, for example describe the various circuit devices, components, or elements, and the electrical connections between these various devices, components of elements that make up the larger integrated circuit design.

This netlist can also be considered to be comprised of a plurality of subgraphs—that is, the larger integrated circuit can be considered to be composed of a larger number of subcircuits or smaller nets, depending on the design rule at hand, different portions of the larger circuit (e.g. subgraphs) will be checked for design rule compliance.

Thus these different subgraphs will often provide a variety of different potential starting points from which various electronic design rules can be tested.

Here the user (usually a circuit design engineer) enters at least one template into the software for at least one electronic design rule (design rule). As previously discussed, this design rule will usually pertain to a certain regions or subsets of the larger circuit (here various circuit regions or subsets are generally referred to as "subgraphs"). Those regions or subgraphs of the larger circuit that are the specific subjects of a given design rule will also occasionally be designated using alternate nomenclature as being a design rule "target", or "candidate circuit element to be tested", or equivalent nomenclature.

The design rule will also include a design rule compliance portion comprising one or more criteria or tests to be applied to the rule's various targets (relevant circuit subsets, subgraphs, rule candidates, etc.). The system is usually configured so that if any given circuit subset, subgraph, target or candidate fails to pass the design rule compliance portion of the rule, the system will then be triggered to report the offending target as having a rule violation. Thus the design rule compliance test portion of the rule is sometimes referred in alternative nomenclature as the "trigger" portion of the rule.

The system thus operates on a two step basis where the steps are:

Step 1: use the candidate identifier portion of a design rule to search the netlist for, and identify or find, matching targets, subgraphs, or candidates that the design rule compliance portion of the design rule then applies to. Optionally report the results to verify correct target selection.

Step 2: apply the design rule compliance (e.g. test) portion of the design rule to the various targets or subgraphs previously identified in step 1, and report results (e.g. report non-compliant targets, and other information as appropriate).

The method will often operate by accepting an integrated circuit netlist and at least one design rule template as input from the user. This design rule template will contain a first candidate identifier portion, and a second design rule compliance test portion.

The system will then use the candidate identifier portion of the design rule to automatically (e.g. using the computer processor and various search algorithms) search the netlist for the larger circuit for various starting points and/or candidate circuit elements (subgraphs, targets) to subsequently be tested using the design rule compliance portion of the electronic design rule template.

Here, for the candidate identifier portion of the design rule template, the system can use various criteria to find such candidates or subgraphs. For example, the candidate identifier information used as input to the netlist search process can utilize variables such as the net name pattern of this design rule relevant portion of the circuit, or other criteria such as the connected device name pattern, or arrangement of circuit components. The candidate identifier portion of the design rule template can also use various logical criteria (e.g. Boolean logic or algebra type parameters such as "if-then-else" instructions) to help identify the proper design rule targets or subgraphs during this part of the process. Such criteria can often be entered in as short bocks of text. As will be discussed in more detail shortly, often use of various graphical methods that help the design engineer better visualize the appearance of the design rule target subgraphs can assist in this process as well.

The invention's software will then take the candidate identifier portion of the design rule template, and using the processor, search the larger circuit's netlist for portions of the larger circuit that match the candidate identifier portion of the rule. The particular parts or subgraphs of the larger circuit that are so identified (regardless of if they pass the design rule compliance portion of the design rule template or not) are then usually at least saved in memory, and often also output for the user to examine. The results of this initial search will then serve as the starting point for the second phase of the method. Those portions of the circuit that are found by the search will be occasionally referred to as starting points, candidate circuit elements to be tested, targets, subgraphs, and the like.

Depending on how skillfully the design engineer has defined the candidate identifier portion of the design rule, the number of targets or rule relevant subgraphs found by the search may be unexpectedly too low, unexpectedly too high, or the wrong targets or subgraphs may be returned. In order to ensure that the design engineer has in fact entered in the correct candidate identifier portion of the design rule, often it will be useful to set the system to output the results of this step 1 search in human readable form. This way the design engineer can examine the output targets or rule relevant subgraphs, and make corrections to the candidate identifier portion of the design rule template as needed to help ensure that when the design rule compliance portion of the design rule template is then applied, the design rule compliance portion of the template is acting on the correct targets.

In particular, because computer searches can often fail to identify relevant items that differ slightly from the search criteria, in some embodiments it will be useful to further implement various additional measures to ensure that the step 1 (search for and find candidates) portion of the process is finding all portions o the circuit that may be relevant to the rule at hand.

The efficiency and flexibility of this step 1 target or starting point search can be extended by various methods. Some of these methods include the use of wildcards or ranged attributes for the candidate identifier search. Other methods that also can be used include using various logical rules or Boolean operations (e.g. if-then-else type logic). This type of logic can be implemented by, for example, allowing the user to enter in various text patterns (e.g. text based instructions such as If "X" then "Y") into the search portion of the system software. These various candidate identifier methods can be combined, so that a user might use wildcards or ranged attributes to specify which net name patterns, connected device name patterns, arrangement of circuit elements and the like are valid candidate identifier search targets; and blocks of Boolean logic code such as "If "X" then "Y" can also be used to help refine the candidate identifier search.

Any and all methods of entering in design rule templates are within the scope of the invention. For example, with respect to the candidate identifier portion of the design rule template, although often the user may enter in various wildcards, ranged attributes, and Boolean operations by typing these in into a system software form or template as a block of text patterns, other methods of entering in this type of data, such as clicking radio buttons, check boxes or other standard GUI input methods may also be used. To simplify this discussion, however, these types of wildcards, ranged attributes, Boolean operations, names and the like will usually be designated by the term "text pattern", regardless of if, for example, the user actually typed in text or clicked on a GUI checkbox.

Examples of other Boolean logic methods that might be used for the step 1 (candidate identifier) portion of the process include various instructions that may give contingent results depending on if a given subgraph in the netlist has an ESD clamp, a current mirror, a digital stage, certain band gap parameters, netlist information suggesting that this portion has been manually designated (handcrafted digital regions), and/or evidence that the subgraph has or is exposed to multiple voltages.

In a preferred embodiment, to reduce the need for the circuit designer to do complex programming, the system will often provide graphical assistance for at least the step 1 target selection part of the rule checking process. This is useful because, as previously discussed, circuit designers often view circuit design issues from a graphical perspective (e.g. as a diagram of connected devices), and thus can more easily understand circuit information when this is presented in a more familiar graphical perspective.

Here for example, in a preferred embodiment, the system software may also provide a computer graphical user interface to allow the user to input a graphical pattern for this step 1 (candidate identifier portion) search. This graphical pattern normally comprises a pictorial description of the portions of the larger circuit that will be the target of the design rule in question. Put alternatively, the graphic pattern will often, at least in part, show a pictorial diagram of those step 1 subgraphs that will be the target of the design rule to then be applied in step 2. Often this graphic pattern will comprise a collection of one or more electronic devices and/or building blocks, most of which are usually electrically connected to each other.

Here the graphical pattern usually defines at least one electronic device in the circuit (e.g. transistor, IO pad, etc.) often with at least one pin connection and at least one attribute (e.g. the device's geometry or name).

The graphical pattern can also comprise various electronic circuit building blocks, such as IO pad definitions, IO directionality definitions, Primary high clamps, Primary low clamps, series resistance in signal clamps, secondary high clamps, secondary low clamps, and so on.

This graphic pattern can then be used; along with other information (e.g. user entered radio buttons, blocks of text patterns, and the like) to identify, from within the netlist of the larger circuit, the various target subgraphs or candidate circuit elements that will then be later tested according to the design rule compliance portion of the design rule template. In essence the targets or candidate circuit elements found by the first step 1 (target identifier) portion of the search thus act as starting points for the later design rule compliance portion of the method.

In the step 2 "design rule compliance test" part of the process, the method will then take the targets or candidate subgraphs previously identified in step 1 above, and test these "target candidate subgraphs" against the design rule compliance portion of the design rule template to identify which of the target candidate subgraphs identified in step 1 above are also compliant with the design rule compliance portion of the design rule. One result of this process is, of course, to identify noncompliant candidates circuit portions (or noncompliant subgraphs). These design rule noncompliant portions of the larger circuit are occasionally referred to in the alternative as trigger rule noncompliant subgraphs.

In some embodiments, the step 2 design rule compliance portion of the rule template will test the various targets or candidate subgraphs previously found in step 1, and determine which (if any) of these targets or candidate subgraphs may have missing components or connections. Thus this set of step 2 design rule compliance tests may comprise various rules for determining if various components or connections are missing from the target subgraphs previously found in step 1. This can be done, for example by first using a wildcard to specify that a potential component may or may not be present in a target subgraph for step 1, but then in step 2 making the design rule be that the component must be present. The result may then be expressed as a first larger set of all targets, with those targets that lack the required component singled out or marked in some way.

When the system's (step 2) design rule compliance test detects a design rule violation, the system can report, for example, the identity of the offending subgraph, the type of design rule violation, number of number of similar design rule violations detected, the severity of the design rule violation as well as the name of the offending device, circuit subgroup, subgraph and/or the overall placement of the offending subgraph in the overall circuit (e.g. show where the design rule violation occurred in the larger integrated circuit design or netlist).

Although many different design rules may be tested using these methods, the methods described herein are particularly useful for testing various Electrostatic Discharge (ESD) design rules, IO design rules, clamp design rules, driver/receiver design rules, top-heavy driver design rules, and IO pair combination design rules.

The system can then do various things with the results, such as reporting the results, often in some sort of ranked order, and often in context with various candidate subgraphs that did pass the rule. The system can also store the results in memory, use the results for subsequent analysis, and so on.

Discussion

In contrast to prior art approaches, which were more based on finding specific circuit elements using topological considerations, the present invention often operates by allowing the user to input a template for a rule that is then applied to collections of things (e.g. parts of circuits, such as a circuit subgraph) in a circuit netlist, usually for a larger integrated circuit chip. The invention often operates as a relatively simple procedural process, often based on the logical arrangement of various circuit devices, device names, and other pertinent data above and beyond mere physical geometries that helps to reduce or eliminating the need for complex procedural programming on the part of the user.

According to the invention, the user may, for example, not have to exactly specify every single circuit subgraph to be analyzed for a given design rule. Rather the user can select, often using a visual or graphical depiction of the subgraph of interest (which may be obtained from a graphical user interface) those target or candidate circuit subgraphs (sections) to analyze for rule compliance.

Additionally, for greater flexibility, instead of requiring that the user specify exactly that the circuit subgraph of interest must contain a particular component (such as a MOSFET wired to function as a diode), the user can specify that a range of possibilities should be examined (e.g., the user can specify that a range of diodes, or even no diode at all, be included in the search).

This can be done by using a wildcard (e.g. a substitute for any character or specification) for any part of the specification.

In some embodiments, the invention's method may operate by first requiring the user to define a design rule template or scenario—that that is require that a user break down a set of more complicated design rules into a simpler set of find object, test object type rules.

To do this, according to the method, the user must first define one or more target subgraphs or starting points to begin the analysis. These starting points should ideally identify all of the potential victims or test subjects for the design rule analysis. A starting point or target can be, for example, an Input/Output IO net (e.g. a chip signal that runs to and from the outside world).

In many embodiments, the invention allows the user to first "pre-test" or verify these targets or subgraph starting points are appropriate, before then running the subsequent design rule checks. These pre-tests can be useful to the user as a "sanity check" to allow the user to be sure that the proper circuit target subgraphs were then used for the subsequent design rule checking process. This can be done, for example, by entering this information into the candidate identifier portion of a given electronic design rule scenario or template, and then setting the invention's software to doing a computer search of the circuit netlist.

The system also allows the user to define the design rule compliance part of the electronic design rule. This can be done, for example, by entering this information in to the "design rule compliance" portion of a given design rule scenario or template.

As a result, once the initial targets or starting point or points have been determined (e.g. the system has been told to "test only these specific IO nets"), the system will then apply the specific design rule compliance portion of the electronic design rule scenario or template of interest to the selected target circuit subgraphs that were previously selected during the earlier part of the process. As a result, in this IO net example, this two step approach allows the user to separate the concept of (1) target groups or types of IO nets from (2) the actual electronic design rules that will be applied to the target IO net selected in step (1).

As previously discussed, the invention's approach of (1) defining one or more target starting points for subsequent rule checking and (2) then applying a relevant electronic design rule to the results from step (1) is occasionally referred to in the alternative as a "scenario" or a "template"

Step 1: Using the Candidate Identifier Portion of the Electronic Design Rule to Find Target or Candidate Subgraphs to be Rule Tested In order to apply a circuit design rule, you must first have something to apply the rule to. Here, however, it is often not sufficient to say "find me an instance of pattern X", because pattern X could be a mismatch and not found, or pattern X could be so loosely defined that it does match anything in the netlist, and thus the system would never see a violation to the that particular design rule.

According to the invention, various different types of candidate subgraphs may be used as rule targets or starting points. These can targets can include a subgraph that has an IO (input or output) to/from the circuit, at the circuit boundary; or alternatively a signal, within the circuit, that crosses from one power domain to another.

IO Checking:

Unfortunately industry conventions with respect to IO points vary somewhat. Thus, for example, an IO can be represented in a netlist in various different ways. Thus, in the case where the analysis rule target or starting point starts at one or more circuit IO points, this variability must be accounted for.

To allow the user to cope with these various different IO conventions, the invention gives the user the option locating IO points using either a "define-by-net" method or "define-by-connection method". The user is then allowed to refine this definition by entering a net name pattern (if the define-by-net method is used) or a by entering a connected device name pattern (if the define-by-connection method is used). These various options can be entered into the system by various ways, such as giving the user a series of preset input selections on a graphical user interface.

Further, for cases where such preset input choices are insufficient, the system may also be configured to allow the user to also enter a block of logical code (e.g. an "if-else block" or "if then else" block of text patterns) to further refine the starting points. As an example: The code might say "if net name=IO* then yes, this is IO. Otherwise, if net has only one pin at top-level, then yes, this is IO"

In a preferred embodiment, much of the "heavy lifting" in terms of target specification can be done by allowing the user to make graphical selections on a graphical user interface. This option is preferred because it reduces the burden on the user to enter in large scripts or blocks of codes. In this aspect of the invention, shown in more detail in FIGS. 8-10, the user can use a visual type graphical environment to rearrange circuit components and connections, The overall effect is not is not unlike filling in a flow chart using Visio, or other graphical programming method. In this graphical environment, the user can click on various shapes representing various circuit components, and also as needed provide optional additional text based input such as a label, Boolean logic instructions (e.g. if-then-else instructions), and the like.

Due to the simplified nature of the invention's graphical programming methods, a user (such as a circuit designer who normally would not be sophisticated enough to write complex full-fledged scripts or software, which would otherwise be necessary using prior art methods) can now perform sophisticated electronic rule checking with minimal amounts of time and effort.

Rather than write a long and complex software script, the user can instead first provide a visual or graphical representation of the rule target subgraphs (candidate identifier data), and supplement as needed with much smaller code snippets as is within the skill of the average circuit designer. At the same time, the invention's combination of graphical input, with short user entered blocks of text or scripts, can greatly extend the functionality and flexibility of the system.

For example, for IO checking, this approach allows the user to automatically find the appropriate IO's, and as needed to further place the various IO into various categories (e.g. "sensitive inputs", "high-drive outputs", etc).

Optional Step 1A Pre-Checking or Verifying (Sanity Checking) the Candidates from Step 1A In contrast to prior art approaches, which don't allow the user to verify what parts of the circuit the software is automatically checking, the invention also allows the user to optionally verify that the system is automatically selecting the appropriate parts of the circuit for design rule evaluation.

This has many advantages over prior art methods. Prior art testing methods tended to operate more as a "black box" approach which hid important details from the user. Without such a verification step, for example, if the user defines a rule such as "all things of X must be connected according to rule Y", the user would not be able to tell if the system has automatically identified all of the appropriate targets "X" (to confirm that the user's target selection criteria were not faulty). By contrast, by allowing a verification step, the invention allows the user to confirm that the target selection criteria are correct. That is, the system can be set to presenting the user with a list of targets found according to the target selection criteria, which the user can examine and use to correct the target selection criteria as needed.

Thus the invention provides a verification or "pre-check" feature, where all of the candidate circuit elements or subgraphs that were found using the candidate identifier criteria are identified, regardless of if the various candidates satisfy the particular electronic design rule at hand or not, thus providing proper feedback to the user that the candidate identifier criteria are correct. See FIG. 8 (806) for an example of this "pre-check" feature in action.

Step 2 Applying the Design Rule Compliance Part of the Design Rule Template.

Not all design rule violations are caused by incorrect electronic devices or incorrectly designed subgraph connections. In some cases, safety devices, such as ESD clamps, may be missing. Thus a key aspect of the present invention is its ability to search candidate circuit subgraphs of interest and determine if they have something missing.

The net combination of the process of finding candidates or targets in step 1, and then applying electronic design rule checking in step 2, is to enable an average circuit designer instruct the invention's software to automatically check if the various portions of a complex integrated circuit design follow a new, local, or otherwise non-standard design rule without having to turn to a team of software engineers for assistance.

For example, using the invention, the circuit designer can enter in commands such as:

"Start with anything named net_A_*(wildcard), then tell me if it does NOT go to 3 diodes".

Here the candidate selection part of the command (part 1) is: IO net_A_*, and the (part 2) electronic design rule compliance part (trigger) part of the design rule template is the rule criteria/trigger that 3 diodes must be connected. Give this input, the invention would then, for example search the integrated circuit netlist, usually first find (and provide as a "pre-check" or "sanity check") that it found candidates such as "net_A_8". The invention would then test this candidate against the above design rule compliance criteria, and report, for example, a design rule violation because that "net_A_8 has no diodes connected".

EXAMPLES

In one embodiment, the user can fill out the first candidate identifier portion of the design rule template by entering in, in a visual environment, a subgraph template image showing one or circuit portions of the larger integrated circuit that are of interest to the user, optionally supplemented by additional data (e.g. text patterns) as needed. This portion of the template can be used to search the netlist for target subgraphs (step 1), and the accuracy of this portion of the template can be verified or pre-checked by the user as previously discussed (step 1A).

Again for purposes of this discussion, a target subgraph (subgraph) of very specific patterns and/or physical attributes (e.g. various electronic devices and electrical connections between these devices) that may be found within a greater circuit, and that are relevant for purposes of the design rule at hand.

As previously discussed, the invention's mixed graphical and text based approach to defining subgraph templates gives the user great flexibility to search and/or locate with great specificity particular electronic devices ("devices"), configurations, and/or combinations of devices and configurations. The invention's subgraph template approach may also alleviate the need to write complex programs every time a user desires to find a particular device/configuration.

As previously discussed, the invention's visual or graphical user interface can allow the user to visually construct various target subgraphs for use by the candidate identifier portion of the rule template. For purposes of candidate identifier information, either graphically entered subgraph information, or text block based information (e.g. various ranges, wildcards, Boolean logic expressions) and the like, may be used.

The graphical pattern can thus represent either some or all of the search criteria for that particular subgraph within the overall larger integrated circuit chip, wherein the graphical pattern is compiled by the interaction between the user and the invention's graphical user interface via a graphical representation of electronic devices, nodes, and associations between the devices and/or nodes. As previously discussed, the user can either supplement or even totally replace the graphical part of the subgraph search criteria by entering in additional search criteria via text, usually also by the software's graphical user interface. The text pattern part of the subgraph search criteria thus may be some of or all the search criteria for the subgraph.

The search criteria may include information from the graphical pattern and/or the text pattern. Graphical and text patterns are discussed further and herein.

FIG. 1 shows at a more abstract level how a design engineer can graphically designate a particular target sub-circuit or subgraph (e.g. subgraph of the larger integrated circuit design) type that the system will search for (using the step 1 candidate identifier search) and subsequently use for electronic design rule checking purposes. To see a specific software embodiment of this approach, see FIG. 8—800 and FIG. 9—900.

In particular, FIG. 1 illustrates how the user can input various subgraph candidate identifier search parameters into the system, here using a graphical pattern 100. As depicted in one embodiment, the graphical pattern 100 comprises device characteristics 110, device characteristics 120, nodes, such as Node A 130, Node B 140, Power 150, and Drain 160, and associations 170-180. Device characteristics are characteristics of an electronic device, also referred to as device, and may include a device type, such as characteristic 112 set to "Type=PFET", a pin attribute, such as pin attribute 114 set to "Pin-Gate" with an association, device geometries, device names, and the like. A device geometry is a physical dimension of a device, such as a width, a thickness and the like. A device name may be arbitrary nomenclature, such as "Cool-Town", and/or provide for a device identification, such as "NFET60" may identify the 60$^{th}$ NFET.

A PFET and a NFET are types of a metal-oxide-semiconductor field-effect transistor (MOSFET), a device used for amplifying or switching electronic signals. A channel of the MOSFET can be of n-type or p-type, and is accordingly called an nMOSFET (NFET) or a pMOSFET (PFET), respectively.

Nodes are any electrical couplings of two or more devices, power sources and/or grounds. Nodes may be identified arbitrarily, such as Node A 130, or descriptively, such as Power 150 representing a power source.

The graphical pattern 100 may couple a device characteristic with a node via an association, such as character 114 is coupled to Node A 130 via association 170. The associations 170-180 are discussed with regard to FIG. 2 and further herein.

As defined herein, a circuit element is a device or a node. Parameters are characteristics of the circuit element, for example a transistor has potentially hundreds of characteristics, some of which are related to pins, types, widths, and the like.

A user may define the characteristics and attributes for devices, nodes, and associations between the devices and/or nodes. Also, the user may specify the transistor to be a PFET, an NFET, or any kind of transistor. Additionally, the user may associate a node to be electrically coupled to two or more devices. For example a user couples two devices to each other, such as a device having device characteristics 110 and a device having device characteristics 120 are coupled together via Node B 140 using associations 170 and 178.

Also, the user may specify one or more pins of a device to be coupled to other nodes, sources, drains and/or other pins of other devices. In one embodiment, a user may specify any combination of characteristics, associations, and nodes that may be represented within a circuit.

In one embodiment, a subgraph template allows the user to construct and/or configure a device and/or device configuration. In one embodiment, the subgraph template allows a user to define candidate identifier search parameters of a circuit using a user interface, and these search parameters will then be used to search the larger circuit netlist for these particular parameters. The user interface may contain blocks, connectors, and/or anything else to define and construct circuit components.

Figure 8:
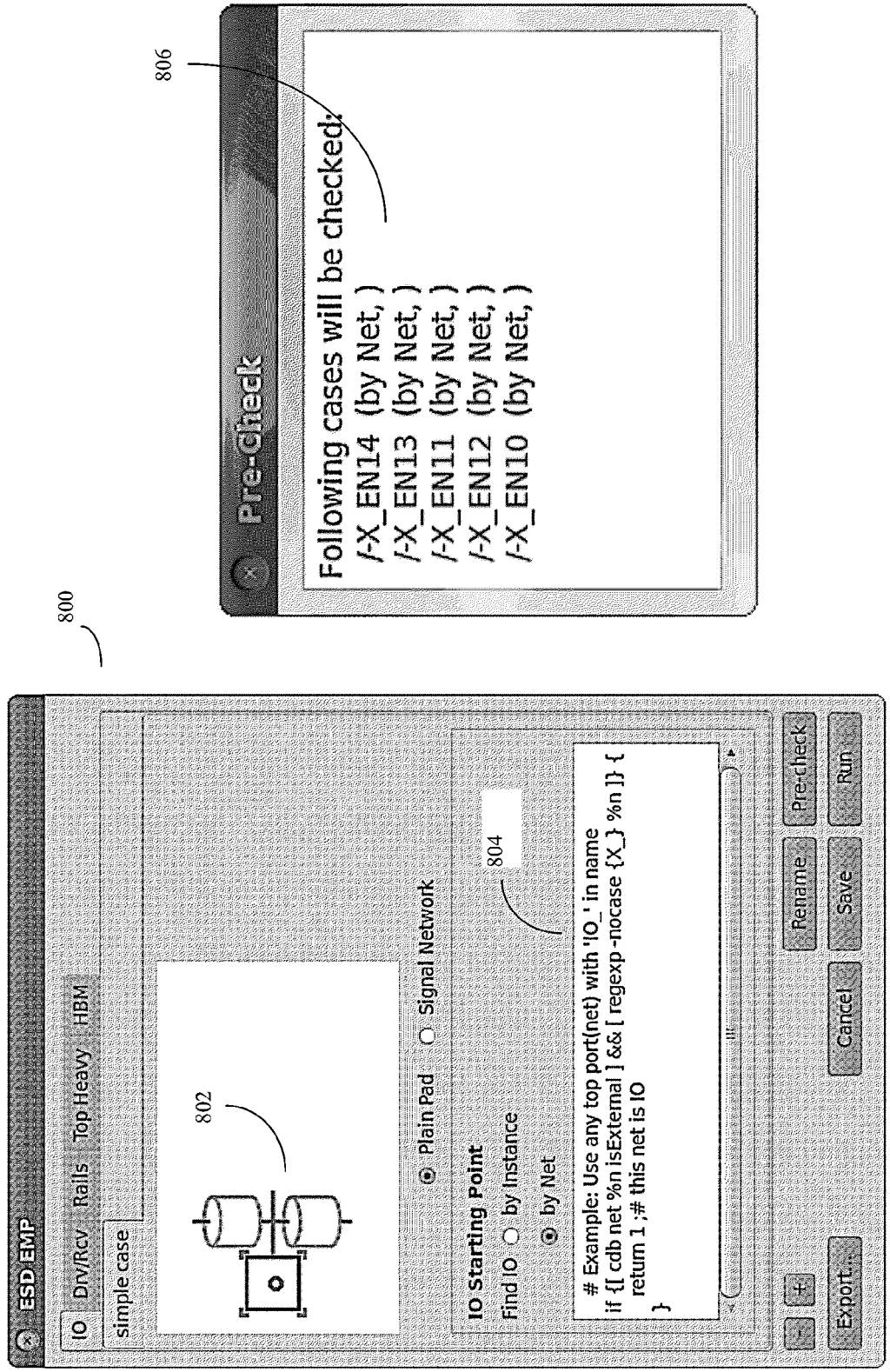
FIG. 8 shows an example of the invention's methods, here implemented in software, and used in step 1 of the process to enter in a set of candidate or target subgraphs that will subsequently be tested for compliance to an ESD design rule. The system searches the netlist for matches, and then optionally outputs those various target or candidate subgraphs (step 1A) that fit the candidate criteria. This helps the user confirm that the original candidate subgraph or target selection criteria are correct.

For a very simple example of the graphical portion of the candidate identifier portion of the design rule template in the system's graphical user interface, see FIG. 8 (802), which shows an alternate circuit component (here an IO pad with ESD clamps. Note that in this example, the diagram is showing a netlist view of this particular target circuit subgraph.

As previously discussed, in one embodiment, a user may also enter in additional search terms to perform a wildcard search or even a fuzzy search for relevant candidate identifier or target circuit subgraphs. This helps the user insure, for example that the system is also finding relevant variants to a graphically entered subgraph search template, rather than missing (not finding) variants that a human expert would recognize as being relevant, but which a too narrowly constrained software search might otherwise miss.

The invention's wildcard searching features can optionally instruct the computer to accept a range of possible values as satisfying the subgraph search criteria. An analogous concept of fuzzy searching may also be used to locate subgraphs that are likely to be relevant to either the candidate identifier portion of a design rule template (or even the design rule compliance portion of the design rule template as well) even when the search argument does not exactly correspond to the desired information. Here, for example, a fuzzy search may also be done by means of a fuzzy matching program, which returns a list of results based on likely relevance even though search argument words and spellings may not exactly match. When outputting targets according to the target pre-check or verification step 1A, often the system may be configured to output exact and highly relevant matches may appear near the top of the pre-check list. The system may also be configured to output subjective or less precise relevance ratings, or extent to which various search parameters are met (e.g. usually as percentages).

As previously discussed, in some embodiments, wildcards may be used to offer a range of candidate identifier search parameters (and optionally also design rule compliance tests as well). This range of search parameters may be entered by the user into the system's user interface in the form of various text values, or by other methods. As an example of a wildcard search, the search name "co*d", where "*" is a wildcard, may find as search results both "cold" and "cord".

According to the invention, either candidate identifier portion of the design rule template may comprise a graphically based subgraph search pattern, and/or text or other type search parameters as well. As previously discussed, often the candidate identifier portions of the subgraph search pattern may be loosely defined. These loosely defined patterns may comprise one or more wildcards and/or a ranged attribute (e.g. a greater than equation such as "X>4", or a less than equation "Y<3" and so on). Here, the system's ability to use searches with wildcards and loose definitions allows a user to select a wide range of parameters prior to knowing exactly what sort of subgraphs are in the larger circuit netlist of interest, does not lock a user into a precise search. This method also allows for broad searching, and/or permits several parameters with a few restrictions and/or rules.

The invention's graphical user interface software may be designed to allow the user to easily reconfigure. various relevant step 1 target subgraph search parameters. For example, in one embodiment, the user can use the system's graphical interface to flip a device's source and drain configuration. To do this, for example, the user may select, from a system GUI pull down window, the option of "D/S" and tie this pin to the node, such as Node B 140. The user may also select another pin's option as "D/S" and tie it to power, such as power 150. Additionally, for a second device, such as device characteristics 120, the user may select "D/S" options for two pins and tie these to Node B 140 and a drain, such as drain 160. Thus a user may effectively complete a flow from a source to a drain by coupling devices to each other and coupling one of the devices to the power and the other device to the ground, as shown in FIG. 1. See FIG. 9-11 for more specific examples of this type of user interface.

The invention's use of visual or graphical input methods to define the candidate identifier portion of the design rule template or scenario may also provide a way for a user to more generally describe certain object patterns within the circuit. These more general object patterns may be non-specific definitions, and/or aspects that result in specific matches. Some examples of this non-specific aspect, as previously discussed, is an ability to allow the user to apply wildcards to names, as well as values, and logical operators (such as greater than and/or less than).

The more general or non-specific aspects of various step 1 target subgraph search portion of the design rule template may also include multiple combinations of devices and/or nodes. The system can allow the user to specify which devices and nodes are essential to the step 1 search, and which are optional, or which set of alternatives can be considered during the subgraph search, thus giving the user another way to precisely control which subgraphs will be found in the larger circuit during the subgraph search. Thus, for example, in the case where a user is conducting a target search for a circuit subgraph that may or may not incorporate a MOSFET device, the user may select various search options, such as the absence of a MOSFET 4th terminal, or the presence of a MOSFET deep N well terminal, or such as a "don't-care" condition.

As previously discussed, the invention may provide target subgraph search templates comprising wildcards, combinations, and an absence of a circuit object and/or a device object. In one embodiment, such as when a more expansive search is desired, an absence of a circuit object and/or or a device objection may be interpreted as TRUE if the searching does not find the object and/or the device objection.

The invention can also be configured to allow the user to enter in various alternatives, modifications and equivalents either build a graphical pattern for a target subgraph search template (used for the first step of the method) or for the design rule compliance portion of the invention's methods (used for the second step of the method). In one embodiment, the user may designate that certain devices may be conditionally coupled to nodes. For example, if a transistor has a width greater than 0.35 micrometers, then it can be either a step 1 search target (or alternatively a step 2 design rule compliance test) if it is also coupled to a ground with a voltage of +0.0 millivolts. Similarly the user can specify that if the transistor has a width of less than 0.20 micrometers it can be a step 1 search target (or alternatively step 2 trigger target) if it is coupled to a ground with a voltage of +0.2 millivolts.

Figure 2:
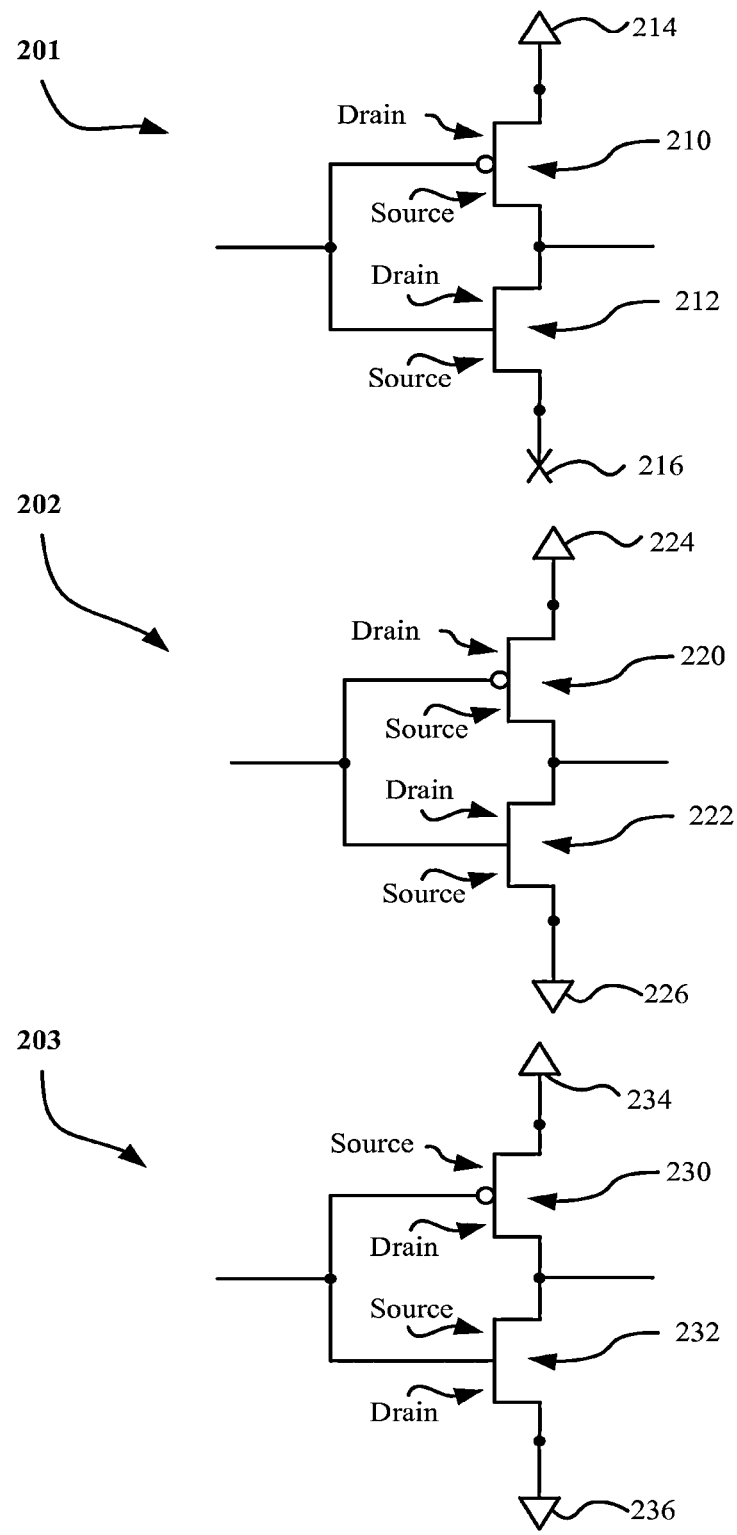
FIG. 2 shows, at a more specific level, how a design engineer can graphically designate a particular type of sub-circuit or subgraph as the target of an electronic design rule. In this example, the designer wishes to apply an electronic design rule to a particular set of circuit subgraphs, each composed of a coupled set of PFET and NFET devices.

FIG. 2 shows, at a more specific level, how a design engineer can graphically designate a particular type of sub-circuit or subgraph as either a step 1 search target portion of an electronic design rule, or alternatively as the design rule compliance portion of a two part electronic design rule template. Here the designer wishes to check for a particular circuit subgraph composed of a coupled set of PFET and NFET devices. In particular, some of the subgraphs previously discussed in the subgraph searching of FIG. 1, are now shown in more detail.

In this example, the subgraph 201 comprises a PFET 210 and an NFET 212 coupled to each other at gates, and also coupled to each other at a source side of the PFET 210 and the drain side of NFET 212. The drain side of the PFET 210 is coupled to a power 214. The source side of NFET 212 is coupled to a node 216. Node 216 is not directly coupled to either a source or a drain.

The subgraph 202 comprises a PFET 220 and an NFET 222 coupled to each other at gates, and coupled to each other at a source side of the PFET 220 and the drain side of NFET 222. The drain side of the PFET 220 is coupled to a power 224. The source side of NFET 222 is coupled to a drain 226.

The subgraph 203 is a source-drain flip of subgraph 202. The subgraph 203 comprises a PFET 230 and an NFET 232 coupled to each other at gates, and coupled to each other at a drain side of the PFET 230 and the source side of NFET 232. The source side of the PFET 230 is coupled to a power 234. The drain side of NFET 232 is coupled to a drain 236.

If the step 1 candidate identifier search specification previously discussed in FIG. 1 is then run on a larger circuit netlist that has all three subgraphs, the invention will find that subgraphs 202 and 203 satisfy this search specification or template. By contrast, subgraph 201 would not satisfy the search specification of FIG. 1, as the source side of the NFET 216 is not coupled to either a source or a drain. Thus the FIG. 1 search specification of FIG. 1 would not include subgraph 201 as a positive "hit" at the pre-check step 1A.

As a result, a search (or preliminary pre-check search) using FIG. 1 candidate identifier search specification would notify the user of these findings. The invention's flexible subgraph search specification's approach thus has the advantage that a user may effectively allow for a flipping of a power and a source via user selections similar to those previously discussed in FIG. 1 (e.g. such selections as the "D/S" for characteristics 116, 118, 126 and 128). Thus by allowing the user to easily select s flipping option, the invention allows a user to specific multiple configuration conditions for one search, thus saving time, resources and unique combinations of devices. More importantly, it also helps insure that relevant search subgraphs (search targets) are not missed for the subsequent design rule checking step 2 of the process.

Figure 3:
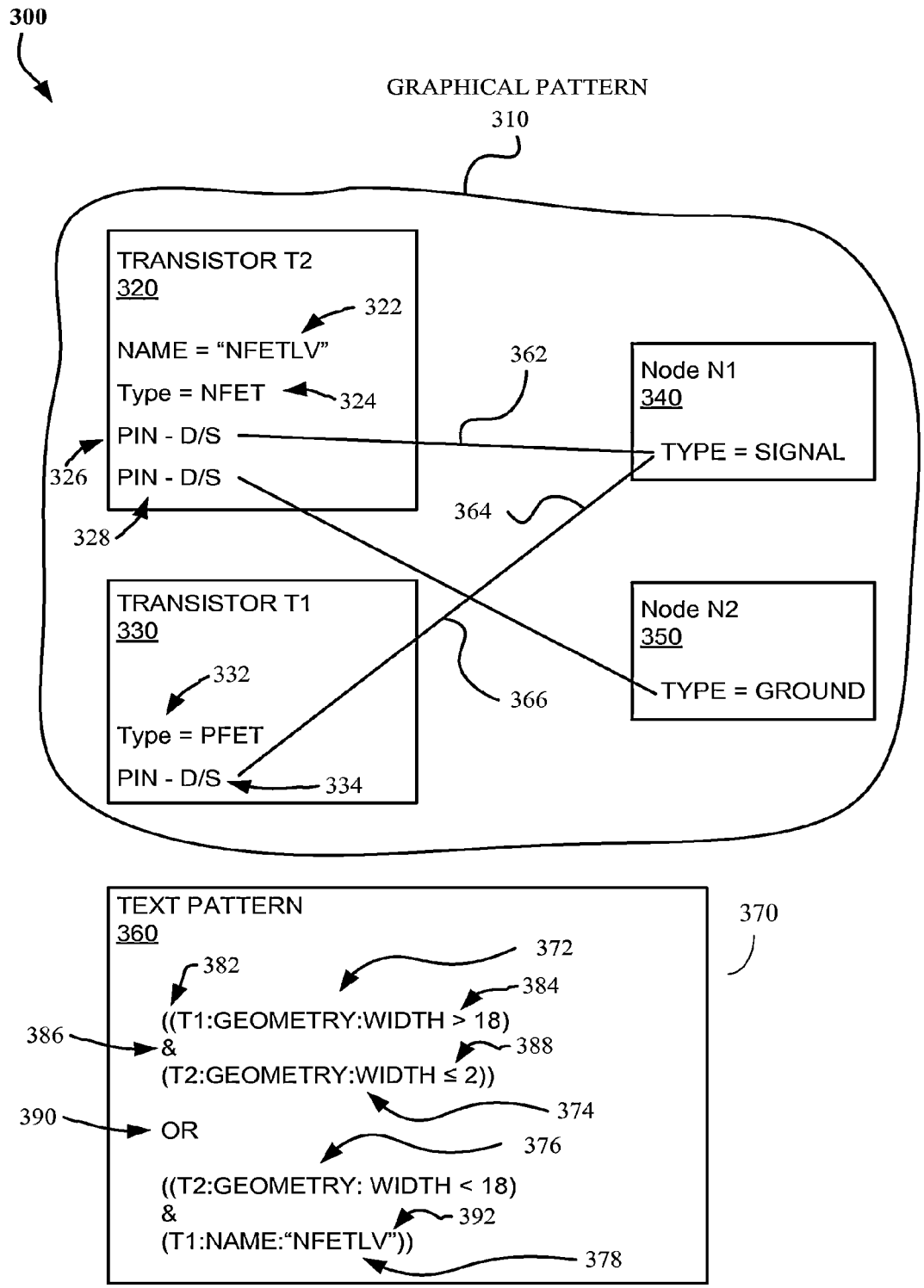
FIG. 3 shows how, in addition to using graphical input to designating a particular type of sub-circuit or subgraph as being the target or subject of an electronic design rule, the system can also accept text input as well, such as an additional specification of device attributes or characteristics, along with various Boolean logic type (e.g. "if, then, else") tests to further help identify the targets of a particular electronic design rule.

FIG. 3 shows how in addition to graphically designating a particular type of sub-circuit or subgraph as the target of an electronic design rule for the netlist search in step 1, the system also allows text input, such as an additional specification of device attributes or characteristics, along with various Boolean logical "if", then, else type tests to help identify the targets of a particular electronic design rule. See FIG. 8—804 for an example.

In FIG. 3, the step 1 circuit subgraph target search parameters 300 include a graphical pattern 310 and a text pattern 370. As depicted in one embodiment, the graphical pattern 310 may comprise various device characteristics, such as device characteristics for Transistor T1 320 and Transistor T2 330, nodes, such as Node N1 340 and Node N2 350, and associations 362-36. These device characteristics may also comprise one or more device names. For example, characteristic 322 is set to "NAME='NFETLV'". The device characteristics can also comprise one or more device types. For example, characteristic 324 set to "Type=NFET". Other characteristics and attributes can comprise one or more pin attributes, such as pin attribute 326 set to "Pin-D/S" with an association, device geometries, and the like.

FIG. 3 also shows the text pattern (370) portion of the step 1 target subgraph search parameters or template as well. Here, as previously discussed this text pattern 370 generally comprises various text strings, such as text strings 372-378, and various mathematical symbols, such as symbols 382-392. These text strings and mathematical symbols can be entered in by the user using the invention's graphical user interface or other method, and are often used to define device attributes and/or device characteristics. For example, the text string "T1:GEOMETERY:WIDTH" 372 can be used to defines a geometric width for transistor 1, and ">18" specifies that the width is to be greater than 18 (micrometers).

As previously discussed, these text strings and the mathematical symbols can be entered in by the user for the purposes of better defining device attributes and characteristics that are not easily expressed using a graphical pattern. For example, the user may instruct the system to search for "A", and further satisfy that A is true (e.g. a search "hit" should be returned) if (X AND Y) OR (Y AND Z) OR (X AND NOT Z). Here the system can be configured to accept many different combinations of mathematical expressions for these purposes. Again, see FIG. 8—804 for a specific example of such a user entered text string.

Figure 4:
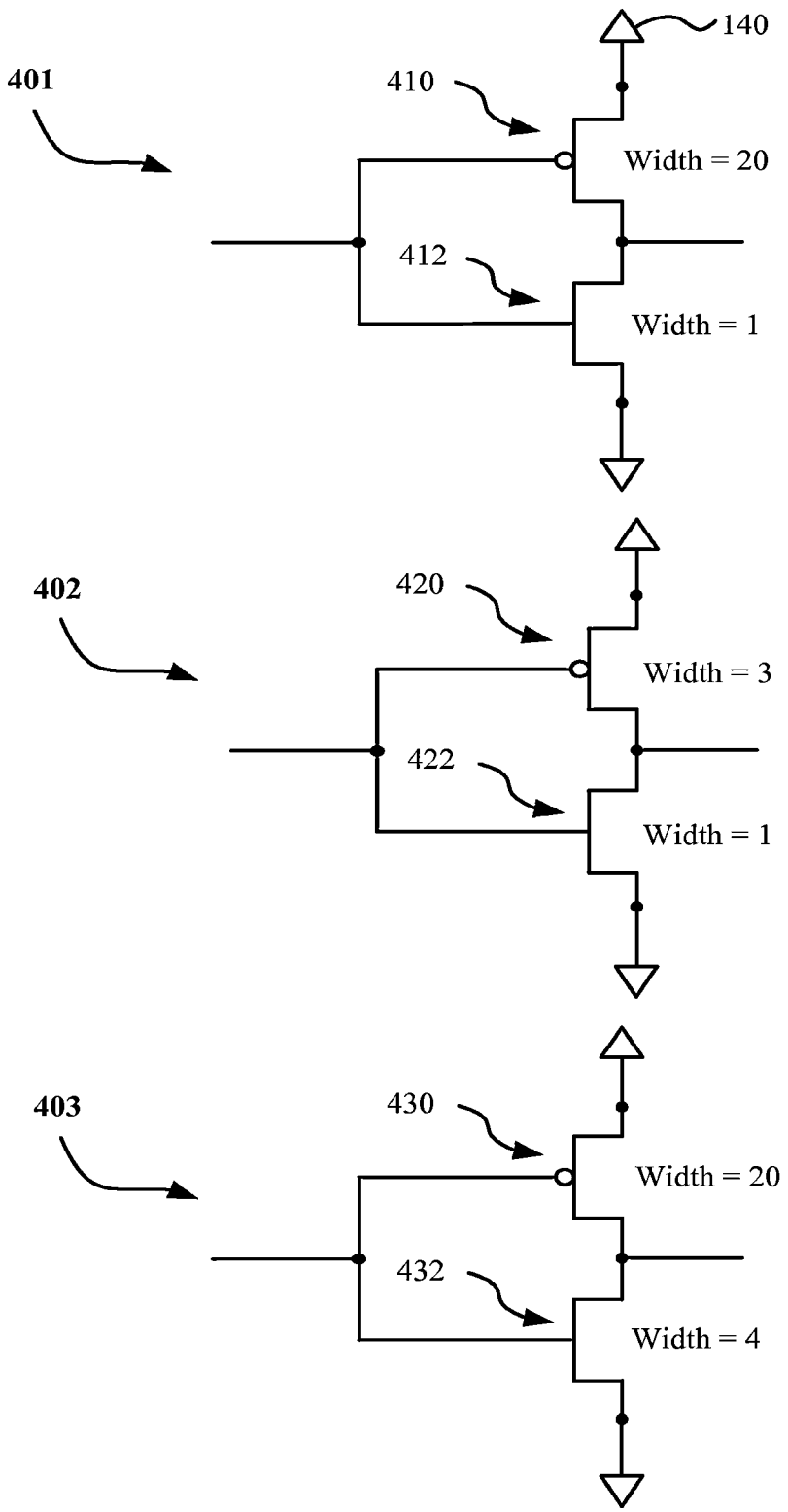
FIG. 4 shows examples of three coupled sets of PFET and NFET devices (e.g. here each coupled set again represents the circuit subgraph that is the target for a particular electronic design rule) that represent the search target for a particular electronic design rule check. Two of these subgraphs additionally satisfy the text input criteria from FIG. 3, but one does not.

To illustrate how these user entered text strings can be used to further refine either the step 1 process of target or candidate identifier subgraph searching, or the step 2 process of applying various electronic design rules criteria (triggers), consider FIG. 4.

FIG. 4 shows examples of three coupled sets of PFET and NFET devices (e.g. here each coupled set represents the circuit subgraph that is the target for a particular electronic design rule) that represent the step 1 search target for a particular electronic design rule check. Two of these subgraphs further satisfy the text input criteria from FIG. 3, but one does not.

Here the subgraph 401 comprises a PFET 410 and an NFET 412 coupled to each other at gates, and coupled to each other at a drain side of the PFET 410 and a source side of NFET 412. The source side of the PFET 410 is coupled to a power net. The drain side of NFET 412 is coupled to a drain net. The PFET 410 has a width equal to 20 micrometers. The NFET 412 has a width equal to 1 micrometer.

By contrast, subgraph 402 comprises a PFET 420 and an NFET 422 coupled to each other at gates, and coupled to each other at a drain side of the PFET 420 and a source side of NFET 422. The source side of the PFET 420 is coupled to a power net. The drain side of NFET 422 is coupled to a drain net. The PFET 420 has a width equal to 3 micrometers. The NFET 422 has a width equal to 1 micrometer.

Again by contrast, subgraph 403 comprises a PFET 430 and an NFET 432 coupled to each other at gates, and coupled to each other at a drain side of the PFET 430 and a source side of NFET 432. The source side of the PFET 430 is coupled to a power net. The drain side of NFET 432 is coupled to a drain net. The PFET 430 has a width equal to 20 micrometers. The NFET 432 has a width equal to 4 micrometers.

As shown, the subgraphs 401, 402 and 403 meet the step 1 target search criteria of the graphical pattern 310 portions of the subgraph search parameters 300, previously shown in FIG. 3. Thus without the additional text pattern constraint, the search would return all three subgraphs in the pre-check or validation search. However, in this example, only subgraphs 401 and 402 also satisfy the text pattern constraint 370 previously shown in FIG. 3. This is because subgraph 403 does not satisfy the condition of T1 having a width equal to or under 2, as per FIG. 3 text string 374, and also does not satisfy the condition of T2 having a width less than 18, as per FIG. 3 text string 376.

In one embodiment, as subgraphs 401 and 402 satisfy the search parameters 300, results to this effect would be provided to a user during the pre-check or validation step 1A. Various software implemented methods by which the invention conducts this search and reports the results are also provided herein.

Figure 5:
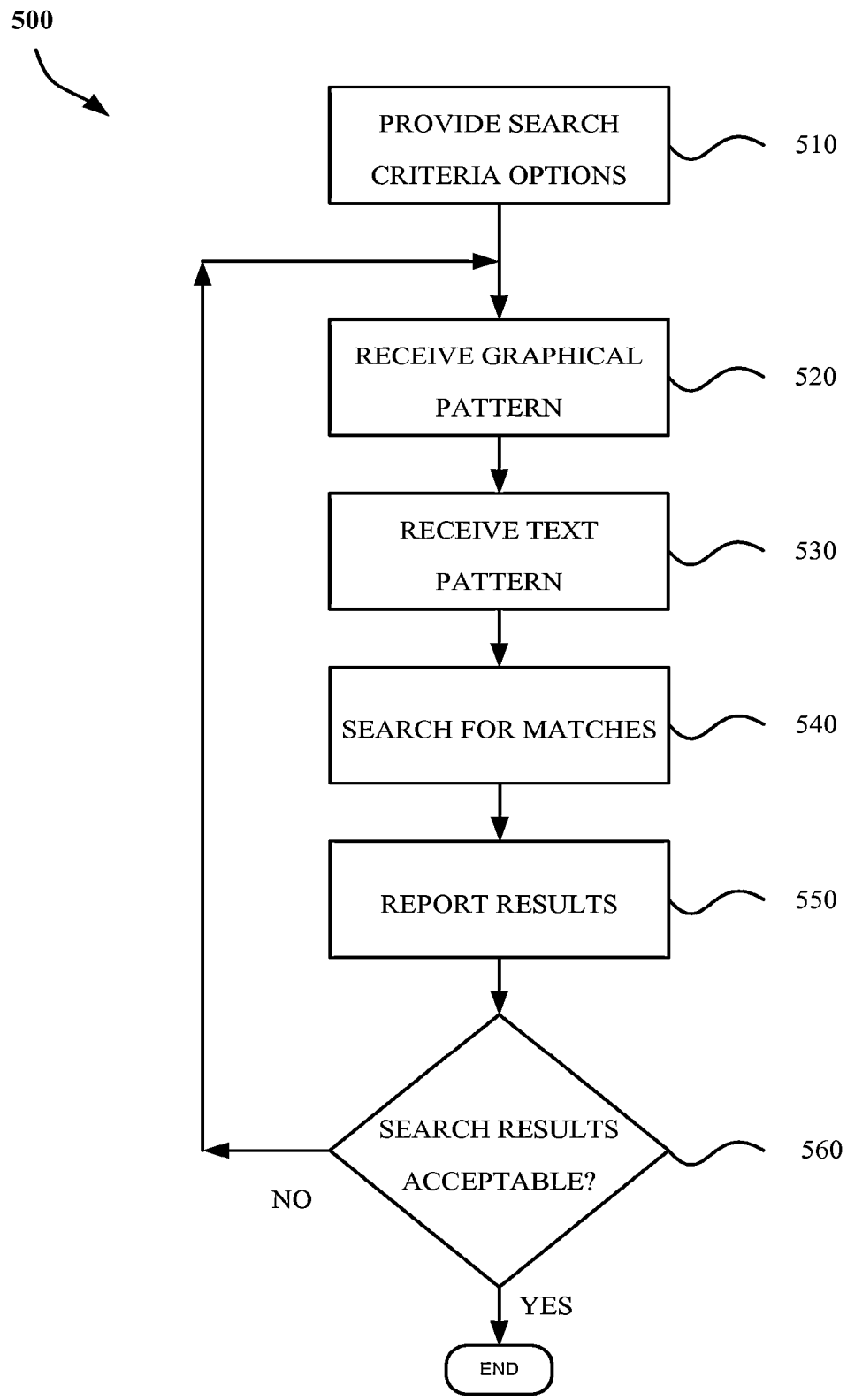
FIG. 5 shows a flow diagram illustrating certain details of how the invention's method may be implemented in software. In some embodiments, the graphical target criteria, together with any text based additional criteria, may be used to find at least the initial targets for subsequent design rule checking.

FIG. 5 shows a flow diagram illustrating certain details of how the invention's methods may be implemented in software. In some embodiments, the graphical target criteria, together with any text based additional criteria, may be used to find at least the initial step 1 targets for subsequent design rule checking.

Here flow diagram 500 optionally starts with step 510, in which the system software optionally automatically provides or suggestion various search criteria options to the user, often via the software's graphical user interface.

As previously discussed, the search criteria options provide a way for a user to select and/or indicate desired step 1 target subgraph circuit search criteria within the larger circuit netlist. As earlier, these step 1 subgraph circuit search criteria may include the previously discussed graphical subgraph pattern, a text pattern further specifying various subgraph parameters of interest, and the like. The step 1 search criteria options may be presented to a user in a standard graphical user interface using standard formats such as templates, forms, boxes and the like. The user may select and/or enter these search criteria options using a mouse, keyboard, touch screen and/or any other user input interface. See FIG. 9-11 for some specific examples of this interface.

In step 520, the invention's software receives a graphical pattern from the user giving information pertaining to the step 1 target subgraph(s) of interest. In optional step 530, the software application also receives a text pattern from the user further refining the step 1 target subgraph search parameters.

In one embodiment, after the application receives the step 1 target subgraph search criteria and a netlist describing the larger circuit (e.g. the integrated circuit netlist), the application, in step 540 then uses the previously entered search criteria to find matches, that is, circuit subgraphs, in the larger circuit.

In some embodiments, the application performs a first step 1 search for subgraphs after receiving the graphical pattern and the larger netlist, and then performs either a design rule compliance search, or a step 1 sub search, separate from the initial search, using the text pattern.

Although in some cases, an additional step 1 sub search may be a refined search or subset of the first graphical pattern based first search, this need not always be the case. In some situations, given that the user can specify wildcards or fuzzy search parameters in the text pattern, the second sub search may be a superset of the first graphical search (i.e. larger than the first graphical search). This is particularly true when the text pattern portion of the step 1 candidate identifier portion contains wildcards, fuzzy searches, and the like. Because of this, the system may often either manually or automatically elect to combine the graphic pattern parameters and text pattern parameters into a single step 1 candidate identifier search.

Once step 1 and optional step 1A of the candidate identifier subgraph target search has been completed, thus finding various target or candidate subgraphs, the invention will then next apply the electronic design rules (found in the design rule compliance section of the design rule template) to these previously identified target or candidate subgraphs.

Figure 9:
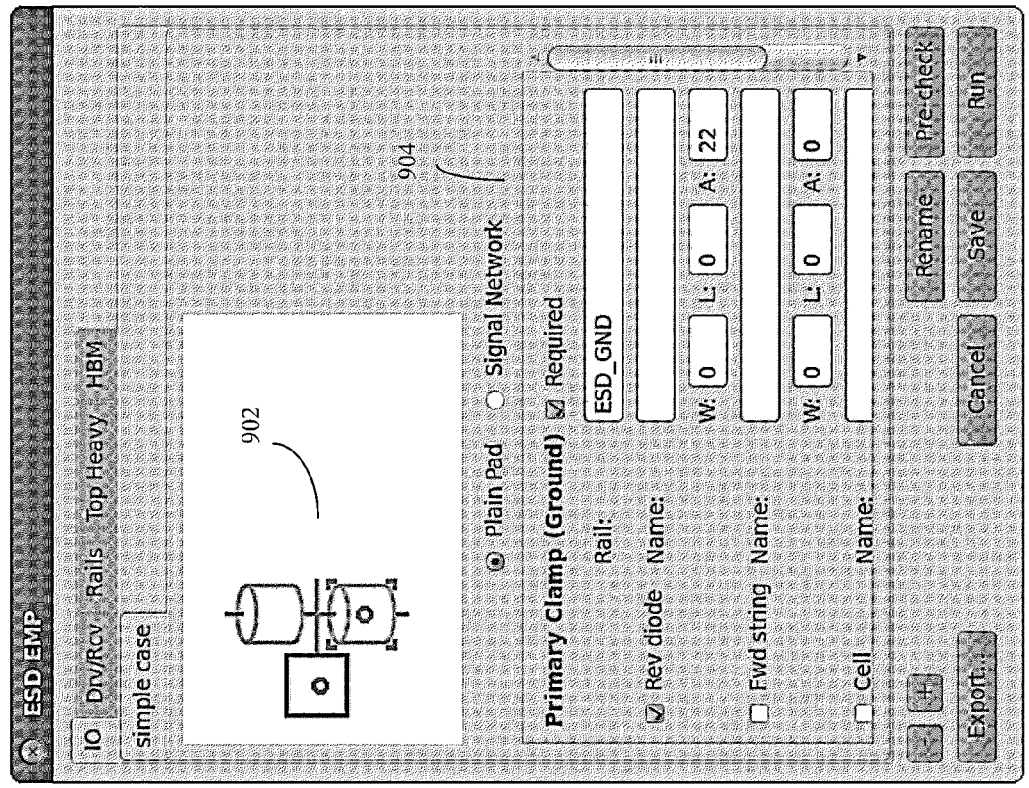
FIG. 9 shows an example of the user using the invention's software system to enter in a particular design rule for step 2 of the process. The system then determines if the previously selected target or candidate subgraphs either meet or violate this ESD design rule. In this example, the system has found multiple examples of ESD design rule violations.

In some embodiments, these design rule compliance parameters, used for step 2 of the process, can also be entered in using the system's graphical user interface. This can be done by filling in standard GUI input check boxes, radio buttons, fields and the like, and can even be done on the same GUI page as the graphical step 1 input, as is shown in FIG. 9-904, or on a different GUI input page (see FIG. 10—1006) specifically designed for design rule compliance parameter data entry.

These electronic design rules can be used by the system to further establish a sub-group of potential discrepancies (i.e. target or candidate subgraphs that fail to follow the electronic design rules). One advantage of the invention's two step approach is that multiple sub-groups may be identified and then rapidly reviewed by a user for purposes of then determining an appropriate troubleshooting scenario. For example, if there is a power leak, multiple subgroups may be identified by the system as sets to be analyzed rather than individual devices, thus saving time.

As previously discussed, in a preferred embodiment, two searches are performed, a target (candidate identifier) search (e.g. previously discussed step 1 and optional step 1A) and a design rule compliance (trigger) search (previously discussed step 2). For the target search, as previously discussed, the application performs a search for subgraphs using parameters entered in by the use in a visual or graphical pattern either with or without the previously discussed text pattern rules.

The target subgraphs identified in the step 1 target search may be further examined using the step 2 design rule compliance portion of the method, and the numbers of target results reduced to a smaller number of subcircuits that fail the electronic design rules.

The step 2 design rule compliance part of the process is typically done using its own text pattern, or other electronic design rule entry pattern (e.g. standard GUI input methods), which can also be entered into the system by the user as well. Again see FIG. 9—804.

In the case where the electronic design rule is entered in using a text pattern, the electronic design rule may or may not be equivalent to the text pattern previously used in the first search step 1. Frequently, for example, the text pattern used to define electronic design rule in step 2 is different from the text pattern used to define the target subgraph search in part 1.

Both the step 1 target search and the step 2 design rule compliance check may employ one or more complex conditions. In one embodiment, a complex condition is a relationship between parameters of two or more circuit elements. In one embodiment, a complex condition is a relationship between two or more circuit elements.

As previously discussed, for both purposes of the step 1 search and for purposes of the step 2 design rule application, text patterns can be used to enable the user to help create higher order definitions, such as Boolean logical definitions, that otherwise may not be well captured using only visual or graphical target subgraph input. See FIG. 3, and as previously discussed.

In step 550, the application reports the results of the target and or rule violation matches to the user. Either the target or the rule violation report may list subgraphs, a frequency of similar subgraph types, and the like. In one embodiment, the report categorizes the subgraphs into groups based on similar troubleshooting resolutions, difficulty and/or complexity of troubleshooting, physical location within the circuit and/or the like. For specific examples, see FIG. 8—806 (results of a step 1A target search before the step 2 electronic rule has been applied) and FIG. 9—906 (results of both a step 2 target search and then a step 2 electronic rule check).

As previously discussed, in one embodiment, the user first does a step 1A preliminary review of the search results to determine if the step 1 search results are reasonable, either before then applying the step 2 electronic design rule, or alternatively prior to applying the step 2 electronic design rule in order to determine if the target subgraph search parameters need to be refined further.

Here, for example, a user may determine if the initial subgraph search results are acceptable based on various criteria. These criteria can include the number of matched subgraphs (is the number of targets unexpectedly small or large), a preconceived subgraph the user is looking for (i.e. "Why isn't my reference subgraph showing up in this search?").

The user may also use the system in an iterative manner in which the user may first run the step 1 search with an initial set of target subgraph search parameters, then run the step 2 electronic design rules, and then compare the results to various known issues, such as common failures and the like. Thus if, for example, the system is outputting matched subgraphs showing one or more common errors that are known to the user, the user may determine the system is configured in a desirable manner to assist in later circuit trouble-shooting.

In one embodiment, the application itself may automatically determine if the step 1 search results are acceptable. The application may determine if the search/matched results are acceptable based on the total number of results. For example, if the matched results are several thousand subgraphs, then the application may report a result that is too numerous to represent in a user friendly format if all the subgraphs are reported individually, and it may optionally suggest various possible step 1 search refinements.

In step 560, if either the user or the system determines that the search results are not acceptable, then the application returns to step 520. Here the user can change and typically refine either the step 1 candidate identifier search graphical pattern and/or text pattern, or the electronic design rule (for step 2 of the process). This allows a user to refine either the target search or the rule criteria. If the search results are acceptable, the application will normally then be ended by the user.

Figure 6:
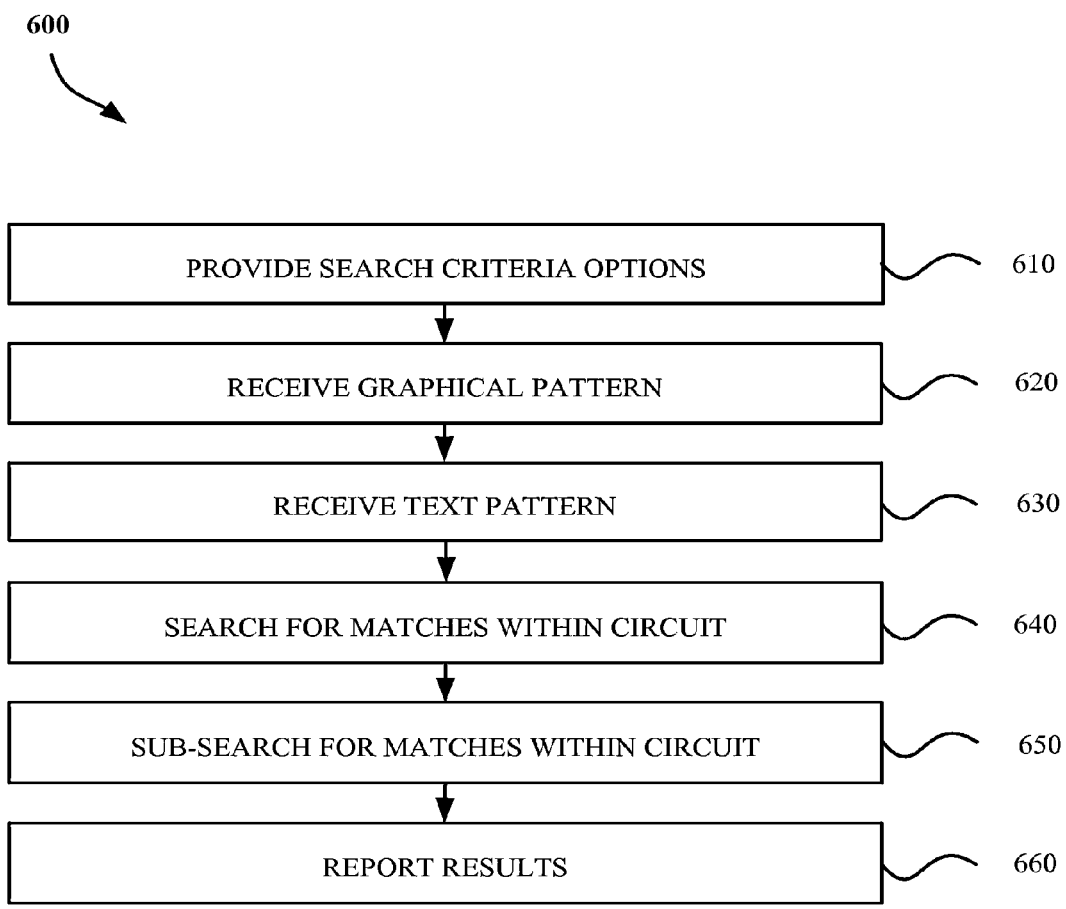
FIG. 6 shows a flow diagram showing how once various candidate circuit elements or targets have been identified, various design rules may then be further applied this set of candidates to determine if all of these targets or candidate subgraphs follow the rule, or if some do not follow the rule.

FIG. 6 shows a flow diagram also showing how once various candidate circuit elements or targets have been identified, various design rules may then be further applied this set of candidates to determine if all of these candidate subgraphs follow the rule, or if some do not follow the rule.

In step 610, the invention's software may optionally provide various search criteria options to a user, as well as various electronic design rule criteria, as previously discussed. In step 620, the invention's software application receives a subgraph graphical search pattern from the user. In optional step 630, the software application receives either an optional subgraph search text pattern from the user, and also the electronic design rule parameters, which again are often in text pattern form themselves.

In step 640, the invention's software application performs step 1 of the process, in which it uses the previously entered target subgraph graphical pattern and optional subgraph search text pattern as search criteria to find matches, that is the step 1 target subgraphs that will be targets of the subsequent step 2 electronic design rule (candidate subgraphs). In step 650, the software performs step 2 of the process. Here the software applies the design rule compliance checks (often entered in by the user in text pattern form) to the step 1 target candidate subgraphs previously identified in 650 to find matches or design rule violations (e.g. subgraph circuits that violate the electronic design rule) within the circuit. In step 660, the application reports the results to the user.

Here too, as previously described, the step 1 subgraph search pattern can use a graphical subgraph pattern (e.g. a small netlist showing the components and the connections in the subgraph of interest) for the more generic attributes of the subgraph targets of interest. The user can then expand or refine this generic description using a text pattern for the more complicated attributes. This text search pattern approach can be useful when the search problem is too complicated for the graphical search pattern approach, or when the graphical approach is inadequate to allow for a large number (e.g. hundreds/thousands) of various search combinations and/or permutations.

Various alternatives, modifications, and equivalents may also be used. In other embodiments, the system may search for step 1 target subgraphs for an electronic design rule using one or more text patterns and/or one or more graphical patterns in any order. Further, in some embodiments, the step 1 subgraph searching may be conditionally branched depending on a prior search, such as if X number of subgraphs are found, then perform search one, otherwise perform search two. Therefore, the above description should not be taken as limiting the scope of the invention which is defined by the appended claims.

Figure 7:
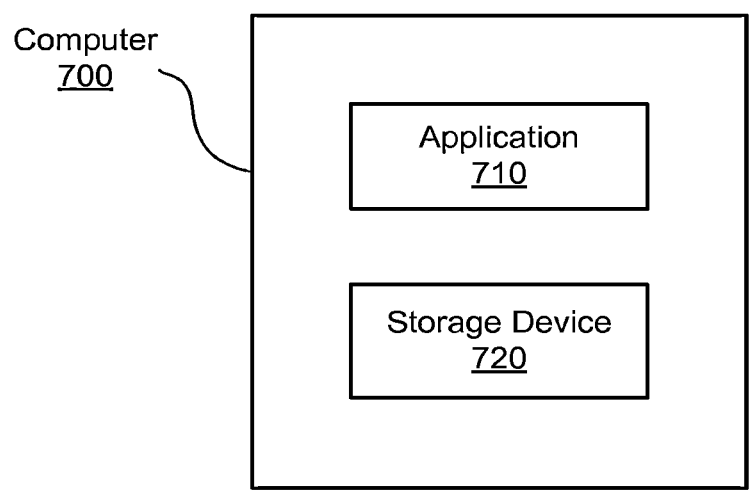
FIG. 7 illustrates a block diagram of a computer system that may be used to run the invention's software based methods.

FIG. 7 illustrates a block diagram of a computer system (700) that may be used to run the invention's software based methods. The computer will generally comprise at least one processor (often one or more microprocessors, each with one or more cores, often based on popular processors such as the x86, MIPS, ARM family, Power PC and the like), memory (e.g. RAM memory), usually persistent storage (720) an operating system, and one or more software modules configured to run the various methods described in this disclosure (710) as an application. The system will often also have input/output devices (e.g. bitmapped display screens, keyboards, printers, pointing devices such as mice and the like), and an optional network connection, which are not shown in FIG. 7.

Typically the system will require a computer readable netlist as input, which will usually be stored in storage device (720). This netlist will usually describe a relatively complex integrated circuit that is being developed and design rule debugged by the user or the user's group or user's client. The system will generally also require the user to input various electronic design rules in the form of target subgraphs (e.g. the search parameters (300) needed to execute step 1 of the invention's method) and the trigger part of the electronic design rules, needed to execute step 2 of the invention's method. This information, along with search results and the like, may also be saved in storage device (720).

In various embodiments, the computer 700 contains a computer readable medium having embodied thereon a program, the program being executable by a computing device for performing a method for subgraph searching and reporting. The program is configured to receive search parameters; to receive a netlist and to report findings.

In some embodiments, the invention's electronic rule checking methods may be optionally be run as a software module within a larger software system that additionally performs other functions as well. This larger software system, in addition to including various user interface elements, may also include additional types of circuit analysis methods, such as software implemented methods to automatically determine power nets, and the like. These various modules are described in more detail in provisional application 61/303,507, the contents of which are incorporated herein by reference.

In particular, in some embodiments it will be useful for the methods of the present disclosure to automatically identify power and ground nets in the integrated circuit netlist, per the methods of copending application Ser. No. 13/401,704, the contents of which are incorporated herein by reference. Other useful methods that may be used to complement or assist in the methods disclosed herein include methods of determining high level power distribution and interface problems, as per the methods of copending application Ser. No. 13/451,530, the contents of which are incorporated herein by reference. Other methods, such as various methods to predict electronic circuit floating gates, as per the methods of copending application Ser. No. 13/345,721, incorporated herein by reference, and the methods of automatically identifying level shifter circuits, as per the methods of copending application Ser. No. 13/483,585, also incorporated herein by reference.

Figure 10:
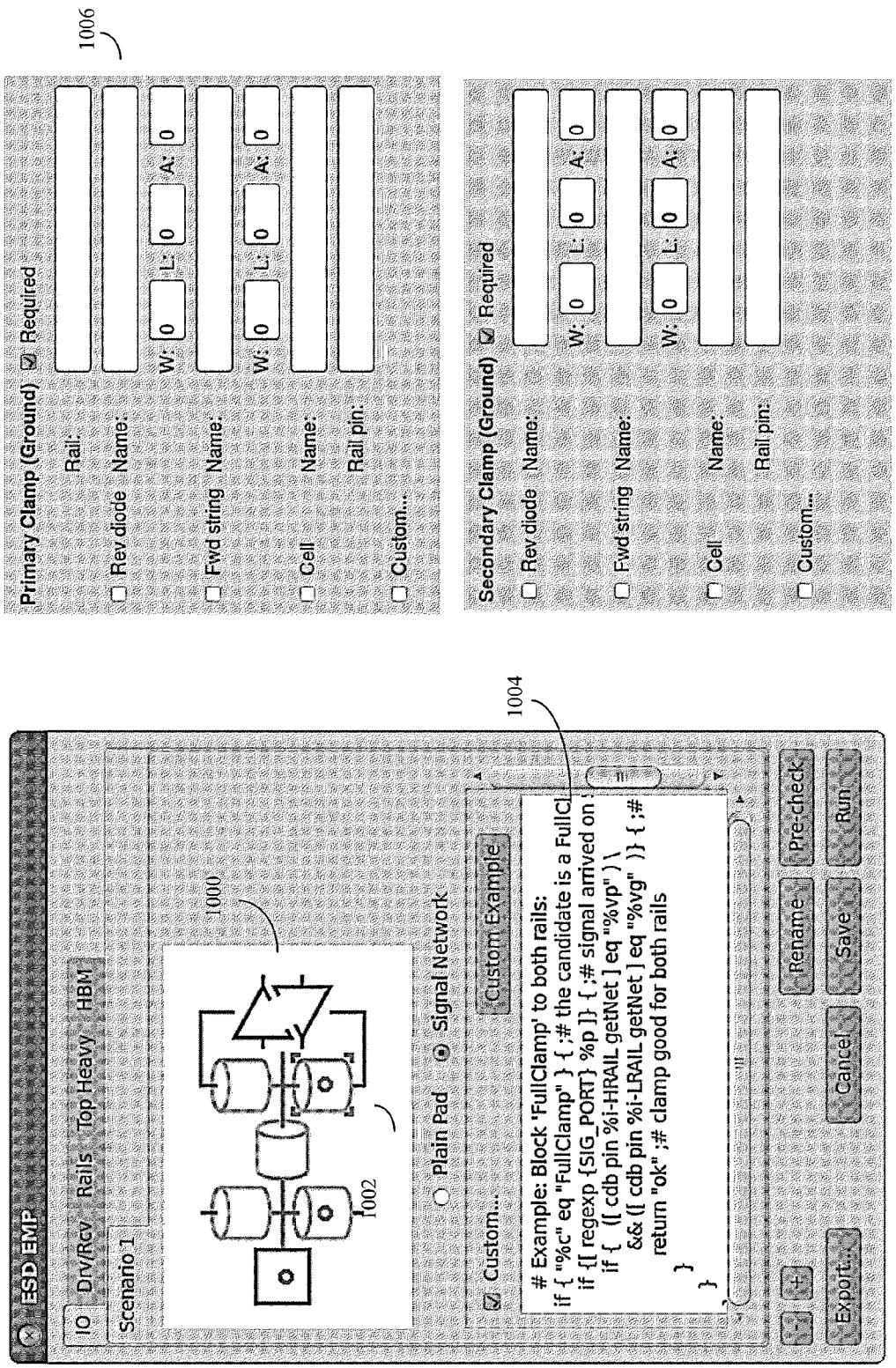
FIG. 10 shows the same principles at work, this time using somewhat more complex target subgraph as an example. Here on the left, the user is using the system's graphical interface to inform the system (for the step 1 search of the process) that a target or candidate identifier portion of the design rule testing includes a secondary low clamp. The user has also entered in additional text (a block of text patterns) describing this portion of the target identifier in more detail. On the right (for the step 2 design rule compliance part of the process) the system is providing a GUI interface where the user can use to enter in the design rule compliance portion of the design rule template.

FIGS. 8, 9, and 10 give examples of how the invention can be used to perform certain specific types of electronic rule checking problems. These methods are also described in more detail in provisional application 61/731,443, the contents of which are incorporated herein by reference.

FIG. 8 shows an example of the invention's methods, here implemented in software, and used to enter in a set of step 1 candidate identifier subgraphs 802 to later test for step 2 compliance to an ESD design rule 804, and which then outputs (step 1A) various pre-check subgraphs 806 that fit the target candidate criteria to let the user verify that the target candidate criteria are correct.

The method shown in FIG. 8 is particularly useful for checking big circuits with diversity of ESD protection requirements, such as full-chip integration.

In practice, in some embodiments, the ESD module may be first configured by a CAD engineer, then run by a circuit design engineer. Here the amount of pre-configuration needed can vary from little or none for simple ESD checking, up to more substantial pre-configuration in when various proprietary or sophisticated ESD electronic design requirements are used.

In this embodiment, the user's integrated circuit design (netlist) can be tested against a library of design rules, such as: "This type of IO must have that type of clamp". In the case of ESD testing, many of the ESD design rules are often name-related rules, and these names can apply to block cells and primitive devices. The design violation results returned by the system usually indicate missing items or illegal connections.

This approach can also test the user's integrated circuit against various hypothetical ESD events, such as human body model "IO zap" combinations. Here the system can output results that indicate the circuit's expected electrical behavior in these situations.

Here, the user will first define what IO types are being checked for ESD design rule compliance. This can be done by having the user use the system to define what IO pads are going to be the topic of a particular ESD rule check. This can be done by defining various IO pads characteristics such as the IO pad directionality and the like. Additional searches and tests, such as existence of primary high/low ESD clamps, presence of series resistance in the signal path, presence of secondary high/low ESD clamps, and the like.

Using these methods, the user can then use the system to execute various ESD rule checking scenarios. Again, as previously described, each ESD rule checking scenario is done by first defining something about the target IO subgraph to ESD rule check, and doing a step 1 netlist search and identifying the various targets. The system can then be set up to test these candidates for various step 2 ESD design rules, such as ESD IO clamping rules.

Other ESD design rule problems, such as the previously discussed pad zap combinations, can also be tested using these methods. Here the invention's methods can be used to audit a particular integrated circuit chip design, and examine all potential problems between all IO pairs over an entire integrated circuit netlist (e.g. report on each IO pair and their corresponding clamp voltage through the best case path found).

This can be done by searching for target IO pairs using the previous described search method, and in a IO pair wise manner testing the "best" path with the smallest voltage drop between each two I/Os. The initial step 1 search portion of the method can report on all IO pair combinations and provide each IO pair's voltage drop violation. The step 2 design rule part of the application can report or flag each open voltage drop as an electronic design rule violation.

FIG. 9 shows an example of the user using the software system to enter in a particular target design 902 rule (step 1) and design rule compliance information 904 (step 2) on the same GUI page 900 and the system determines if the previously selected candidate subgraphs meet or violate this ESD design rule 906. Here the larger circuit netlist has multiple design rule violations.

FIG. 10 shows the same principles at work, this time using a larger target circuit subgraph 1000 as an example. Here on the left, the user can use the system's graphical interface to first select that a target for the design rule testing is a secondary low clamp 1002. Here the user is entering in the candidate identifier information (step 2 data) as a text block with some Boolean logic "if" statements on the same GUI page. The user is also entering in additional (step 2) design rule compliance test information on a different GUI input page as well 1006.

Other Applications:

In addition to checking IO pads for compliance with various ESD protection rules, the methods of the present invention are also useful for other electronic design rule checking purposes as well.

Some of these other applications include Driver/Receiver Checking—that is checking an internal integrated circuit network for cases where a driver may originate in one power domain, but the receiver (or victim device) of the driver's output may be located in a different power domain. In such situations, compliance for various design rules such as appropriate series resistance, and determining if the relevant subgraph's clamp type and/or geometry to the receiver device's high or low power rails is appropriate to this situation.

Another application for the invention's methods includes checking for top-heavy driver design rule violations.

Here, the general electronic design rule for both inverters and any other form of such P/N stack or P/N subgraph, either within the chip, or in IO situations, is that a small NFET device must not be dwarfed by a much larger PFET above it. (In this case, "small" means the NFET is a single-finger device (no parallel instances, M=1)).

Here the first search part of the method can be set to first report on all such P/N stack configurations, and the electronic design rule second part of the method can then be set to apply various electronic design rules to the various subgraph targets that were found by the search.

Similarly, one type of electronic design rule is that when the threshold of P-to-N width ratio (i.e. PFET too large) exceeds a certain amount, then this is a rule violation (PFET too large).

Another electronic design rule is to test to see if the specific PFET width is at a preset upper-most allowed limit, and to test if the specific NFET width as at a preset lower-most allowed limit. It is an electronic design rule violation if both of these limits are met or exceeded.

As a specific example, if the user enters as an electronic design rule (either by text patterns or by clicking on user interface buttons) that the maximum P size cannot exceed 12.0 microns, and the minimum N size cannot be less than set to 0.4 microns. If the actual circuit subgraph has a PFET with a width of 15.0 microns (i.e. above this electronic rule's preset limit of 12), and the actual NFET subgraph has a width of 0.24 microns (below the electronic rule's preset limit of 0.4), the system would report this particular P/N subgraph as an electronic rule violation.

The invention claimed is:

1. A computer implemented method of checking electronic circuit netlists for compliance to at least one design rule, said method comprising:
   providing a computer non-transitory readable netlist of an integrated circuit to be tested, said netlist comprising a plurality of subgraphs and candidate circuit elements;
   defining a template for at least one design rule, said at least one design rule comprising a candidate identifier portion and a design rule compliance portion;
   wherein said candidate identifier portion of said design rule comprises at least one wildcard or at least one ranged attribute;
   wherein said design rule compliance portion of said design rule further comprises rules to determine components or connections that are missing from said first set of target subgraphs;
   using said candidate identifier portion of said at least one design rule to define at least one subgraph and/or candidate circuit element to be tested, wherein said at least one subgraph or candidate circuit element to be tested are defined by either their net name pattern, connected device name pattern, arrangement of circuit components, or block of Boolean logic candidate selection rules;
   wherein said net name pattern, connected device name pattern, arrangement of circuit elements, or block of Boolean logic candidate selection rules comprises at least one wildcard or at least one ranged attribute;
   further using the graphical user interface of a computer to input a graphical pattern comprising a collection of one or more electronic devices and/or building blocks to at least partially define said candidate identifier portion of said at least one design rule;
   wherein said building blocks comprise at least one building block selected from the group consisting of IO pad definition, IO directionality definition, Primary high clamps, Primary low clamps, series resistance in signal clamps, secondary high clamps, and secondary low clamps;
   using a computer processor, said definition of at least one subgraph or candidate circuit element, said netlist, and said candidate identifier portion of said at least one design rule to perform a first search broadly identifying a first set of target candidate subgraphs; and
   using a computer processor, said first set of target subgraphs and the design rule compliance portion of said at least one design rule to identify compliance of said first set of target subgraphs to the design rule compliance portion of said at least one design rule, thereby identifying design rule noncompliant subgraphs;

and either reporting or storing in memory said first set of target subgraphs and said design rule noncompliant subgraphs; and wherein for at least some of said design rule noncompliant subgraphs, further reporting at least one of type of violation, number of similar violations, severity of violation, device name, circuit subgroup, or placement in the circuit.

2. The method of claim 1, wherein said at least one Boolean logic candidate selection instruction comprises at least one instruction selected from the group consisting of an ESD clamp search instruction, a signal diode search instruction, a current reference search instruction, a current mirror search instruction, a voltage reference search instruction, a power switch search instruction, a digital stage search instruction, a band gap search instruction, an amplifier search instruction, a handcrafted digital search instruction, and a multiple voltage search instruction.

3. The method of claim 1, further supplementing said graphical pattern with at least one Boolean logic candidate identifier instruction.

4. The method of claim 1, wherein said graphical pattern defines at least one electronic device with at least one pin connection and at least one attribute, and wherein said at least one attribute further comprises a device geometry or a device name.

* * * * *